United States Patent
Limburg et al.

(10) Patent No.: US 12,280,827 B2
(45) Date of Patent: Apr. 22, 2025

(54) VEHICLE STRUCTURE COMPRISING AN ENERGY STORE

(71) Applicant: Bayerische Motoren Werke Aktiengesellschaft, Munich (DE)

(72) Inventors: Andre Limburg, Munich (DE); Julian Patscheider, Munich (DE); Alexander Rupp, Munich (DE); Paul Winkler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 337 days.

(21) Appl. No.: 17/925,728

(22) PCT Filed: May 20, 2021

(86) PCT No.: PCT/EP2021/063426
§ 371 (c)(1),
(2) Date: Nov. 16, 2022

(87) PCT Pub. No.: WO2021/259561
PCT Pub. Date: Dec. 30, 2021

(65) Prior Publication Data
US 2023/0347982 A1    Nov. 2, 2023

(30) Foreign Application Priority Data
Jun. 24, 2020   (DE) ............... 10 2020 116 554.4

(51) Int. Cl.
*B60K 1/04*    (2019.01)
*B62D 21/15*   (2006.01)
(Continued)

(52) U.S. Cl.
CPC .............. *B62D 21/157* (2013.01); *B60K 1/04* (2013.01); *H01M 50/242* (2021.01);
(Continued)

(58) Field of Classification Search
CPC .............. B62D 21/157; H01M 50/242; H01M 20/249; H01M 2220/20; B60K 1/04
See application file for complete search history.

(56) References Cited

U.S. PATENT DOCUMENTS 5,911,426 A * 6/1999 Yamamoto ............... B60G 3/04
280/124.128
10,494,030 B1   12/2019 Paramasivam et al.
(Continued)

FOREIGN PATENT DOCUMENTS

CN    106585722 A    4/2017
CN    107492607 A    12/2017
(Continued)

OTHER PUBLICATIONS

International Search Report (PCT/ISA/210) issued in PCT Application No. PCT/EP2021/063426 dated Jul. 21, 2021 with English translation (five (5) pages).
(Continued)

*Primary Examiner* — Jason D Shanske
*Assistant Examiner* — James J Triggs
(74) *Attorney, Agent, or Firm* — Crowell & Moring LLP

(57) ABSTRACT

A vehicle structure has an energy store receiving space in which an electrochemical energy store is received and is delimited at below by a lower cross member and above by an upper cross member, a longitudinal profile, and a deformation space arranged geometrically between the longitudinal profile and the electrochemical energy store. The electrochemical energy store has an energy store pressure plate on its side facing the longitudinal profile. An extended pressure plate is arranged in the deformation space having a longitudinal profile contact region for contacting the longitudinal profile, an upper pressure plate cross member extending in the direction of the upper cross member, and a
(Continued)

lower pressure plate cross member extending in the direction of the lower cross member.

10 Claims, 2 Drawing Sheets

(51) Int. Cl.
　　*H01M 50/242*　　(2021.01)
　　*H01M 50/249*　　(2021.01)
(52) U.S. Cl.
　　CPC ... *H01M 50/249* (2021.01); *B60K 2001/0438* (2013.01); *H01M 2220/20* (2013.01)

(56) References Cited

U.S. PATENT DOCUMENTS

| | | | |
|---|---|---|---|
| 11,364,782 B2* | 6/2022 | Abdyli | B60L 3/0007 |
| 2014/0077527 A1* | 3/2014 | Zornack | B62D 25/082 |
| | | | 296/187.1 |
| 2014/0117716 A1* | 5/2014 | Patberg | B62D 21/15 |
| | | | 296/187.08 |
| 2017/0355255 A1 | 12/2017 | Brausse et al. | |
| 2021/0146766 A1* | 5/2021 | Haberl | B60L 50/64 |

FOREIGN PATENT DOCUMENTS

| | | |
|---|---|---|
| CN | 110857025 A | 3/2020 |
| CN | 111196313 A | 5/2020 |
| DE | 19953382 A1 | 6/2000 |
| DE | 697 04 739 T2 | 8/2001 |
| DE | 10 2011 001 861 A1 | 10/2012 |
| DE | 10 2011 103 090 A1 | 11/2012 |
| DE | 10 2011 120 960 A1 | 4/2013 |
| DE | 10 2011 122 527 A1 | 6/2013 |
| DE | 10 2014 224 545 A1 | 6/2016 |
| DE | 10 2018 206 100 A1 | 10/2019 |
| WO | WO 2020/058037 A1 | 3/2020 |

OTHER PUBLICATIONS

German-language Written Opinion (PCT/ISA/237) issued in PCT Application No. PCT/EP2021/063426 dated Jul. 21, 2021 (six (6) pages).

German-language Search Report issued in German Application No. 10 2020 116 554.4 dated Jan. 18, 2021 with partial English translation (10 pages).

Notification of the First Office Action for Chinese Application No. 2020180033053.1 dated Feb. 27, 2025 (with English translation) (16 pp.).

* cited by examiner

VEHICLE STRUCTURE COMPRISING AN ENERGY STORE

BACKGROUND AND SUMMARY

The invention relates to an energy store which is received in a vehicle structure, in particular in a structure of a motor vehicle, and interacts with the latter. The invention proceeds from a vehicle structure, which can also be understood as a so-called crash structure; document DE 10 2011 122 527 A1 also relates to a crash structure for a motor vehicle.

In the following, the invention is described in conjunction with a battery electric motor vehicle, although this is not to be understood as a limitation of the invention to such an embodiment. The electrochemical energy store contains so-called active material, which can lead to damage in the event of an accident and is therefore protected by the vehicle structure. The protection of the electrical energy store has a high installation space requirement, thereby reducing the installation space available for the arrangement of the energy store. It is an object of the invention to specify a vehicle structure with an electrical energy store which has improved space utilization. This object is achieved by a device according to the present disclosure, while preferred developments are also the subject of the present disclosure.

In the context of the invention, a vehicle structure is understood to mean a vehicle frame device or a portion of a supporting vehicle body. In particular, the proposed vehicle structure is used in conjunction with a battery electric vehicle (BEV). In particular, in such a BEV, the electrochemical energy store is arranged in the region of the vehicle underbody. Preferably, a vehicle structure within the meaning of the invention is thus to be understood as a vehicle floor assembly or a portion of the vehicle floor assembly in which the electrochemical energy store is arranged.

In the context of the invention, an electrical energy store is to be understood to be a so-called electrochemical energy store, i.e. an energy store in which electrical power is stored in the form of chemically bound energy and from which the electrical power can also be retrieved. Such energy stores are known from the prior art in the form of lithium ion stores or the like. In the context of the invention, this electrochemical energy store is at least partially or preferably completely received in the vehicle structure in an energy store receiving space.

When the vehicle structure is correctly installed, the energy store receiving space is delimited at least in part downwardly by a lower cross member and upwardly by an upper cross member. Furthermore, the vehicle structure has a longitudinal profile which preferably delimits the energy store receiving space at least on one side. With reference to a cross-sectional profile of the energy store receiving space, this is figuratively speaking preferably delimited on at least one side by a C-shaped structure, wherein the upper limb is preferably formed by the upper cross member, the lower limb is formed by the lower cross member, and the web of the C is formed by the longitudinal profile. Preferably, the longitudinal profile is connected to at least one of the two cross members, preferably connected in a form-fitting manner and preferably in an integrally bonded manner. Further preferably, this vehicle structure, and thus in particular the longitudinal profile, is arranged on a longitudinal side or a front or rear side of the motor vehicle.

In particular, a deformation space is arranged or formed geometrically between the longitudinal profile and the electrochemical energy store. In the context of the invention, a deformation space means in particular an area into which, in particular, the longitudinal profile can deform without colliding with the electrical energy store. In other words, the deformation space is to be understood as an intermediate space between the longitudinal profile and the electrical energy store. Further preferably, the electrochemical energy store has an energy store pressure plate on its side facing the longitudinal profile. Preferably, such a pressure plate is to be understood as a protection means for the electrochemical energy store, which the pressure plate is intended to protect mechanically.

Furthermore, an extended pressure plate is arranged in this deformation space. The extended pressure plate is preferably configured here to absorb and distribute forces in the event of a deformation, in particular a deformation of the longitudinal profile in the direction of the electrochemical energy store, or to redirect the forces, preferably to one of the cross members, and thus to protect the electrochemical energy store mechanically. Preferably, the extended pressure plate has a longitudinal profile contact region, an upper pressure plate diagonal member, and a lower pressure plate diagonal member. In this case, the longitudinal profile contact region is configured so that the longitudinal profile, in particular when this is deformed in the direction of the electrochemical energy store, contacts the latter, or the longitudinal profile contacts the longitudinal profile contact region already in the undeformed state, so that a deformation of the longitudinal profile in the direction of the electrochemical energy store immediately or after the longitudinal profile contacts the longitudinal profile contact region leads to a stressing of the extended pressure plate, wherein these forces, which are applied to the extended pressure plate by the longitudinal profile, are dissipated in the direction of the cross member or cross members by means of the pressure plate diagonal member or diagonal members. Thinking away from the extended pressure plate, with the structure otherwise remaining the same, the longitudinal profile would deform up to the electrochemical energy store, or up to the energy store pressure plate of the electrochemical energy store. With the invention, on the other hand, the forces acting from the longitudinal profile during a deformation in the direction of the electrochemical energy store are diverted to the upper or lower cross member, respectively. In particular, to enable such redirection of the force, the extended pressure plate has the upper and lower pressure plate diagonal members, which extend from the extended pressure plate toward the upper cross member (upper pressure plate diagonal member) and the lower cross member (lower pressure plate diagonal member), respectively. With the proposed configuration of the extended pressure plate, the longitudinal profile is subjected to greater resistance when it is deformed in the direction of the electrochemical energy store, or the installation space for the components surrounding the electrochemical energy store can be reduced with the same resistance and thus the installation space for the electrochemical energy store can be increased.

In a preferred embodiment, the extended pressure plate, or the pressure plate, has a pressure plate compression member. Preferably, this pressure plate compression member extends from the extended pressure plate in the direction of or to the energy store pressure plate and further preferably from the energy store pressure plate in the direction of or to the extended pressure plate. In particular by means of such a pressure plate compression member a further support of the extended pressure plate is achievable and thus a further reduction of the installation space requirement is made possible while maintaining the stability.

In a preferred embodiment, the pressure plate compression member has a predetermined breaking point. For the purposes of the invention, a predetermined breaking point is understood to mean a weakening of the pressure plate compression members relative to the area surrounding this predetermined breaking point. Predetermined breaking points are known as such from the prior art. In particular, by means of a predetermined breaking point, it can be achieved that a deformation, in particular of the longitudinal profile, in the direction of the electrochemical energy store is initially opposed by a high resistance before damage to the energy store pressure plate occurs, the pressure plate compression member fails and forces are diverted via at least one of the compression members to the cross members. Preferably, the predetermined breaking point is configured in particular in such a way that, when the extended pressure plate is loaded in the direction of the pressure plate compression member, the pressure plate compression member fails before at least one of the two pressure plate diagonal members fails. In particular, such a configuration ensures a high level of safety of the electrochemical energy store against mechanical damage and a low space requirement for the surrounding vehicle structure.

In a preferred embodiment, the upper cross member has an upper cross member stop and further preferably the lower cross member has a lower cross member stop. Preferably, the upper cross member stop can be contacted by or is contacted by the upper pressure plate diagonal member and further preferably, the lower cross member stop can be contacted by or is contacted by the lower pressure plate diagonal member. Preferably, such a stop is configured in such a way that a movement of at least one of the compression members in the direction from the longitudinal profile to the electrochemical energy store system is prevented. In particular, such a configuration with a cross member stop enables particularly efficient force redirection from the extended pressure plate to at least one of the two cross members.

In a preferred embodiment of the invention, the energy store pressure plate has an upper pressure plate stop and a lower pressure plate stop. Further preferably, the upper pressure plate stop contacts the upper cross member stop and the lower pressure plate stop contacts the lower cross member stop. In particular, by means of such an embodiment, precise positioning of the energy store pressure plate relative to the vehicle structure is made possible.

The following is an exemplary embodiment of the invention, as well as individual features, which can also be combined in a combination different from the form shown in the figures.

DETAILED DESCRIPTION

Figure 1:
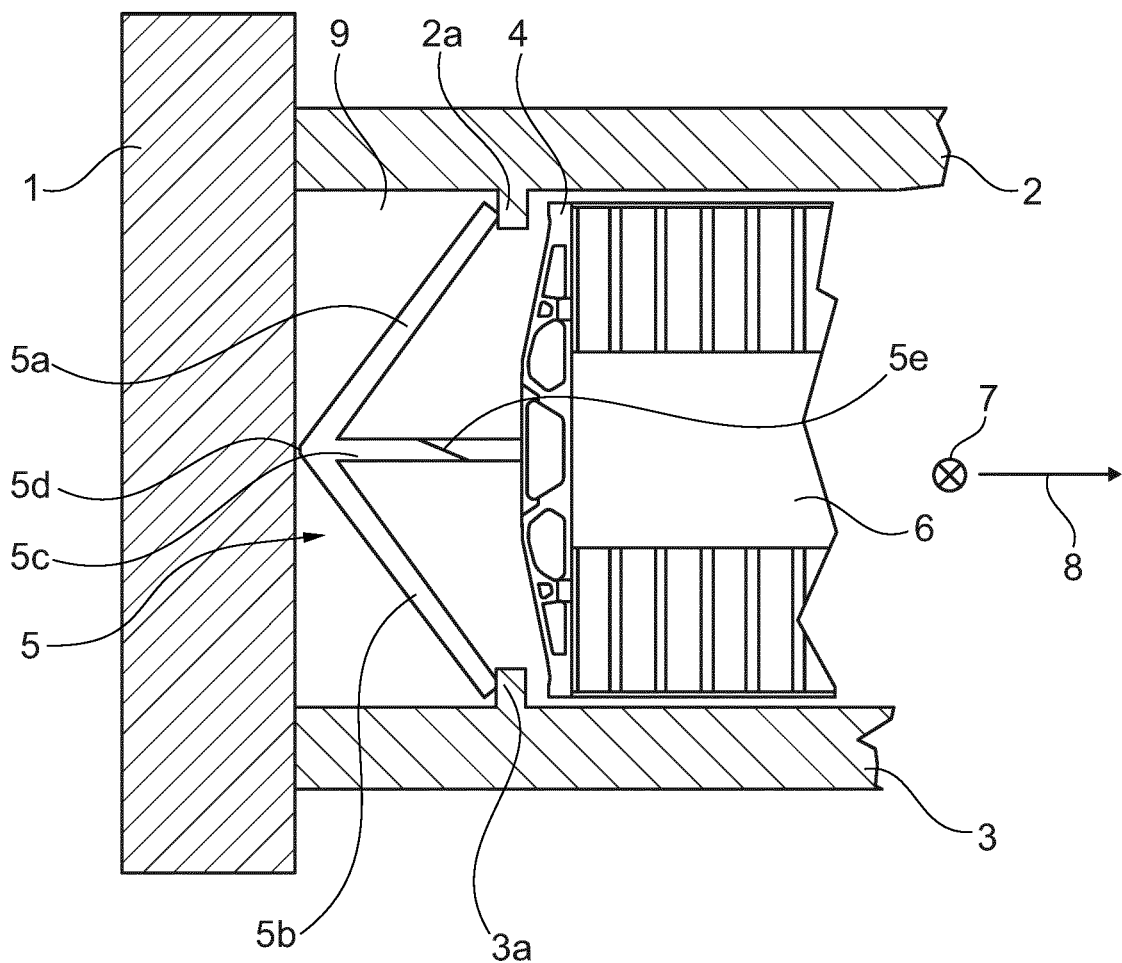
FIG. 1 shows a partial sectional view of a first embodiment of the vehicle structure with electrochemical energy store system incorporated therein.

FIG. 1 shows a partial sectional view of a vehicle structure comprising the longitudinal profile 1, the upper cross member 2 and the lower cross member 3. In FIG. 1, however, only the "left" edge of the arrangement is shown. The vehicle structure extends in the vehicle longitudinal direction 7. The electrochemical energy store 6 is received in the vehicle structure. The electrochemical energy store is protected by means of an energy store pressure plate 4, in particular against mechanical loads from the direction of the longitudinal profile 1. In the event of a side impact, i.e. a load on the vehicle structure in the vehicle transverse direction 8, the longitudinal profile 1 can be deformed in the direction of the electrochemical energy store 6. In particular, the energy store pressure plate 4 mechanically protects the electrochemical energy store 6.

The extended pressure plate 5 is arranged in the deformation space 9. In the embodiment shown, the extended pressure plate 5 has the upper pressure plate diagonal member 5a, the lower pressure plate diagonal member 5b, and the pressure plate compression member 5c. When the longitudinal profile 1 is subjected to a corresponding load in the vehicle transverse direction 8, it contacts the extended pressure plate 5 in the longitudinal profile contact region 5d. The extended pressure plate 5 dissipates the forces thus applied to it via compression members (5a, 5b, 5c). In particular, the upper pressure plate diagonal member 5a and the lower pressure plate diagonal member 5b transfer the forces to the upper and lower and upper cross members 2, 3 via the upper and lower cross member stop 2a, 3a.

The pressure plate compression member 5c has a predetermined breaking point 5e, which ensures that the pressure plate compression member 5c, under a corresponding load, fails before the upper and lower pressure plate diagonal members 5a, 5b fail, so that the load to the energy store pressure plate 4 is limited.

Figure 2:
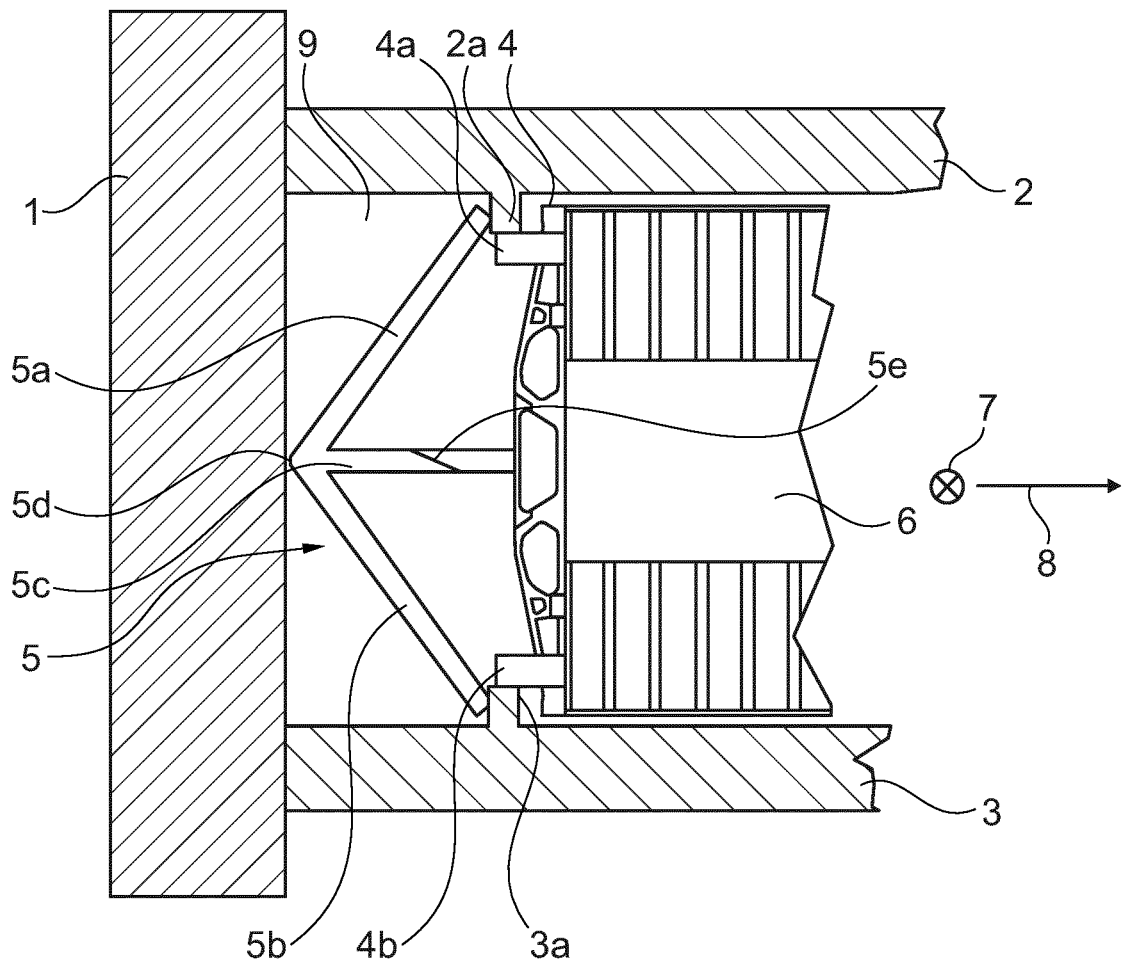
FIG. 2 shows a partial sectional view of a second embodiment of the vehicle structure with electrochemical energy store incorporated therein.

FIG. 2 shows a further embodiment of the invention, wherein the main differences between this embodiment and the embodiment shown in FIG. 1 are discussed below.

The energy store pressure plate 4 has an upper pressure plate stop 4a and a lower pressure plate stop 4b, which results in support and centering of the energy store pressure plate 4 relative to the upper cross member 2 and the lower cross member 3. By means of such an embodiment, additional stiffening of the vehicle structure is achievable in particular.

In other words, in known systems, the transverse and longitudinal struts of the vehicle structure are used to protect the electrochemical energy store, in particular the so-called traction battery. These struts prevent the electrochemical energy store from being damaged by forces acting from the outside. The operating principle is that in the event of deformation of the vehicle structure, energy absorption takes place at least substantially via the compression/deformation of the struts (longitudinal profile, upper, lower cross member), cavities provided between the struts and the electrochemical energy store are not used, or are not actively used.

By contrast, the invention proposes in particular to provide a so-called extended pressure plate, which redirects forces, in particular in a crash scenario, to the cross members; further preferably, this extended pressure plate is likewise deformed and thus additionally absorbs deformation energy and leads to an improvement in safety. Preferably, a predetermined breaking point is provided on the extended pressure plate, preferably on the pressure plate compression member. In particular, this predetermined breaking point is configured to decouple the extended pressure plate from the energy store pressure plate, in particular when a predetermined load is reached or exceeded, and thus to reduce stresses on the electrochemical energy store, in particular to reduce the force acting on the cells, in particular in the event of a crash. In other words, the invention makes it possible in particular to reduce the space required for the longitudinal profile and to increase the installation space for the cell modules, that is to say the electrochemical energy store. It is further advantageous that no additional components are necessary, rather it is sufficient to reconfigure existing components. Preferably, the energy store pressure plate and the extended pressure plate are configured as separate components and preferably these are formed in one piece. Further preferably, it is possible to arrange lines, in particular electrical services, preferably cables, in the region of the extended pressure plate.

With the proposed invention, the following advantages are achievable, depending on the configuration of the embodiment:

additional energy absorption in the event of a crash
lower installation space requirement
more space for cell modules of the electrochemical energy store, higher electric range of the vehicle
low construction effort
additional protected installation space
reduction of free deflectable areas for ground deflection when loaded from below
additional energy absorption in the vehicle transverse direction.

LIST OF REFERENCE SIGNS 1 longitudinal profile
2 upper cross member
2a upper cross member stop
3 lower cross member
3a lower cross member stop
4 pressure plate
4a upper pressure plate stop
4b lower pressure plate stop
5 extended pressure plate
5a upper pressure plate diagonal member
5b lower pressure plate diagonal member
5c pressure plate compression member
5d longitudinal profile contact region
5e predetermined breaking point of 5c
6 electrochemical energy store
7 vehicle longitudinal direction
8 vehicle transverse direction
9 deformation space

The invention claimed is:

1. A vehicle structure comprising:
an electrochemical electrical energy store;
an energy store receiving space in which the electrochemical energy store is received, wherein the energy store receiving space is delimited at least in part downwardly by a lower cross member and upwardly by an upper cross member,
wherein the vehicle structure has a longitudinal profile, and wherein a deformation space is arranged geometrically between the longitudinal profile and the electrochemical energy store, and
wherein the electrochemical energy store has an energy store pressure plate on a side of the electrochemical energy store facing the longitudinal profile,
and
an extended pressure plate arranged in the deformation space, wherein the extended pressure plate has a longitudinal profile contact region, an upper pressure plate diagonal member, and a lower pressure plate diagonal member,
wherein the longitudinal profile contact region is configured to be contacted by the longitudinal profile, and wherein the upper pressure plate diagonal member extends from the extended pressure plate in a direction of the upper cross member, and the lower pressure plate diagonal member extends from the extended pressure plate in a direction of the lower cross member.

2. The vehicle structure according to claim 1, wherein the extended pressure plate has a pressure plate compression member extending from the extended pressure plate to the energy store pressure plate.

3. The vehicle structure according to claim 2, wherein the pressure plate compression member has a predetermined breaking point, wherein the pressure plate compression member is configured to, in response to the extended pressure plate being subjected to a predetermined load in a direction of the pressure plate compression member, fail before at least one of the upper pressure plate diagonal member or the lower pressure plate diagonal member fails.

4. The vehicle structure according to claim 1, wherein the upper cross member has an upper cross member stop, and the lower cross member has a lower cross member stop, wherein the upper cross member stop is configured to be contacted by the upper pressure plate diagonal member, and the lower cross member stop is configured to be contacted by the lower pressure plate diagonal member.

5. The vehicle structure according to claim 4, wherein the energy store pressure plate has an upper pressure plate stop and a lower pressure plate stop, wherein the upper pressure plate stop contacts the upper cross member stop, and the lower pressure plate stop contacts the lower cross member stop.

6. The vehicle structure according to claim 1, wherein the upper cross member has an upper cross member stop, and the lower cross member has a lower cross member stop,
wherein the energy store pressure plate has an upper pressure plate stop and a lower pressure plate stop, and
wherein the upper pressure plate stop contacts the upper cross member stop, and the lower pressure plate stop contacts the lower cross member stop.

7. The vehicle structure according to claim 2, wherein the upper cross member has an upper cross member stop, and the lower cross member has a lower cross member stop,
wherein the energy store pressure plate has an upper pressure plate stop and a lower pressure plate stop, and
wherein the upper pressure plate stop contacts the upper cross member stop, and the lower pressure plate stop contacts the lower cross member stop.

8. The vehicle structure according to claim 3, wherein the upper cross member has an upper cross member stop, and the lower cross member has a lower cross member stop,
wherein the energy store pressure plate has an upper pressure plate stop and a lower pressure plate stop, and
wherein the upper pressure plate stop contacts the upper cross member stop, and the lower pressure plate stop contacts the lower cross member stop.

9. The vehicle structure according to claim 2, wherein the upper cross member has an upper cross member stop, and the lower cross member has a lower cross member stop, wherein the upper cross member stop is configured to be contacted by the upper pressure plate diagonal member, and the lower cross member stop is configured to be contacted by the lower pressure plate diagonal member.

10. The vehicle structure according to claim 3, wherein the upper cross member has an upper cross member stop, and the lower cross member has a lower cross member stop, wherein the upper cross member stop is configured to be contacted by the upper pressure plate diagonal member, and the lower cross member stop is configured to be contacted by the lower pressure plate diagonal member.

* * * * *